US011624971B2

(12) United States Patent
Nakagoshi

(10) Patent No.: US 11,624,971 B2
(45) Date of Patent: Apr. 11, 2023

(54) PROJECTOR SYSTEM

(71) Applicant: JVCKENWOOD Corporation, Yokohama (JP)

(72) Inventor: Ryosuke Nakagoshi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 101 days.

(21) Appl. No.: 17/359,678

(22) Filed: Jun. 28, 2021

(65) Prior Publication Data

US 2021/0325766 A1 Oct. 21, 2021

Related U.S. Application Data

(63) Continuation of application No. PCT/JP2019/043401, filed on Nov. 6, 2019.

(30) Foreign Application Priority Data

Dec. 28, 2018 (JP) ............................. JP2018-247256

(51) Int. Cl.
| | | |
|---|---|---|
| G03B 21/62 | (2014.01) | |
| H04N 9/31 | (2006.01) | |
| G03B 21/14 | (2006.01) | |
| G02B 13/06 | (2006.01) | |
| G03B 21/56 | (2006.01) | |
| H04N 5/74 | (2006.01) | |

(52) U.S. Cl.
CPC ............ *G03B 21/14* (2013.01); *G02B 13/06* (2013.01); *G03B 21/56* (2013.01); *H04N 5/74* (2013.01)

(58) Field of Classification Search
CPC ....... H04N 9/3147; G03B 21/62; G03B 21/56
See application file for complete search history.

(56) References Cited

U.S. PATENT DOCUMENTS

| | | | |
|---|---|---|---|
| 2013/0222386 A1 | 8/2013 | Tannhauser et al. | |
| 2017/0176847 A1 | 6/2017 | Vermeirsch et al. | |

FOREIGN PATENT DOCUMENTS

| | | |
|---|---|---|
| CA | 2305484 A1 | 10/2000 |
| JP | 2000352763 A | 12/2000 |
| JP | 2005283704 A | 10/2005 |
| JP | 2009-206665 A | 9/2009 |

OTHER PUBLICATIONS

International Preliminary Examination Report on Patentability (I) with an English translation for the corresponding PCT Application No. PCT/JP2019/043401 dated Jun. 16, 2021, 9 pages.
International Search Report for the corresponding PCT Application No. PCT/JP2019/043401 with English translation, dated Feb. 4, 2020, 4 pages.
Extended European Search Report from EP Application No. 19906277.9 dated Jan. 28, 2022, 7 pages.

*Primary Examiner* — Ryan D Howard
(74) *Attorney, Agent, or Firm* — Brundidge & Stanger, P.C.

(57) ABSTRACT

In a projector system including a plurality of projector apparatuses each projecting a picture onto a curved screen of transmissive type having a convex rear side as viewed from a user, a control unit divides an input picture into a plurality of pictures, providing an overlapping region between pictures, and supplies a plurality of divided pictures to the plurality of projector apparatuses, respectively. Optical axis of light projected by the plurality of projector apparatuses intersect at a position farther than a central point of the curved screen, as viewed from the plurality of projector apparatuses.

4 Claims, 14 Drawing Sheets

PROJECTOR SYSTEM

CROSS-REFERENCE TO RELATED APPLICATION

This application is a Continuation of International Application No. PCT/JP2019/043401, filed on Nov. 6, 2019, which in turn claims the benefit of Japanese Application No. 2018-247256, filed on Dec. 28, 2018, the disclosures of which Application is incorporated by reference herein.

BACKGROUND

1. Field

The present invention relates to a projector system configured to project a picture taken by using an super-wide angle lens from a plurality of projector apparatuses.

2. Description of the Related Art

In projection mapping, simulators (e.g., flight simulators), etc., a multi-projection system configured to project one picture by using a plurality of projector apparatuses is used sometimes. In a multi-projection system, a plurality of projector apparatuses are normally arranged at equal intervals (see, for example, patent literature 1).

In the case a projector apparatus projects a picture to a curved screen (e.g., a cylindrical screen or a dome screen), a fish-eye lens or a special lens optimized to the curvature of the screen are often used as the lens of the projector apparatus. The picture projected from the projector apparatus via a fish-eye lens or a special lens onto the screen will have a high resolution in the central region and a low resolution in the peripheral region.

In order to project a picture at a remote location onto a curved screen as a picture that provides a sense of immersion in real time, it is necessary to take a high-definition picture at a super wide angle and transmit the picture thus taken with low latency. Methods of taking a high-definition picture at a super wide angle include a method of taking a picture by using a plurality of cameras and taking a picture by using a monocular camera in which a super-wide angle camera such as a fish-eye lens is used. The latter is advantageous in terms of real time performance because of lower load on picture processing.
[Patent Literature 1] JP2009-206665

A picture taken by a super-wide angle lens such as a fish-eye lens will have a high resolution in the central region and a low resolution in the peripheral region. If a picture taken by using a super-wide angle lens is projected from a projector apparatus provided with a fish-eye lens or a special lens, therefore, the resolution in the peripheral region of the image projected onto the screen will be doubly reduced.

SUMMARY

A projector system according to an embodiment includes: a curved screen of transmissive type having a convex rear side as viewed from a user; a plurality of projector apparatuses, each projector apparatus projecting a picture onto the curved screen; and a control unit that divides an input picture into a plurality of pictures, providing an overlapping region between pictures, and supplies a plurality of divided pictures to the plurality of projector apparatuses, respectively. Optical axis of light projected by the plurality of projector apparatuses intersect at a position farther than a central point of the curved screen as viewed from the plurality of projector apparatuses.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

Figure 1:
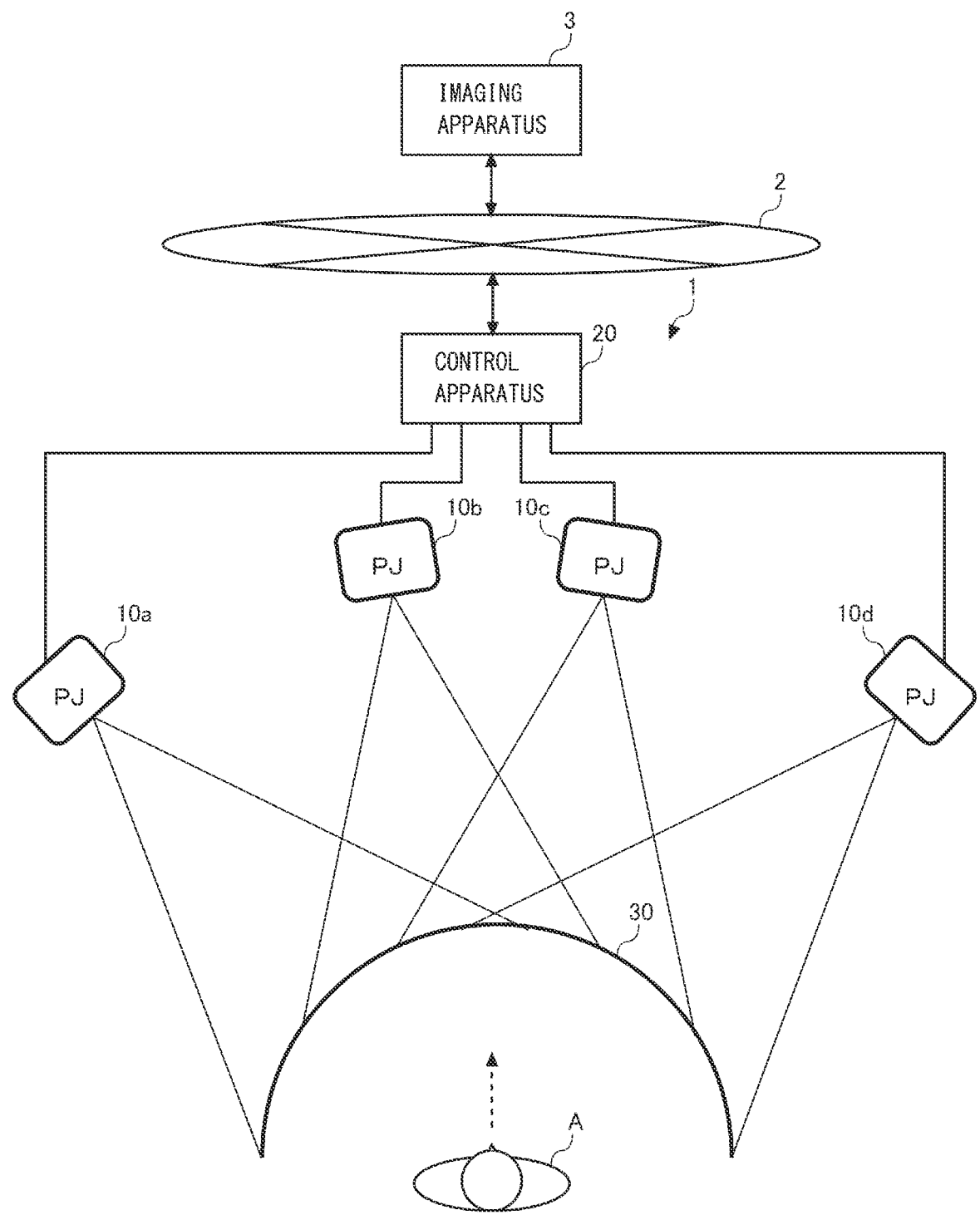
FIG. 1 is a diagram for explaining a projector system according to an embodiment of the present invention.

FIG. 1 is a diagram for explaining a projector system 1 according to an embodiment of the present invention. In the projector system 1 according to the embodiment, a curved screen 30 is used. In this embodiment, a cylindrical screen of transmissive type having a convex rear side and curved in the horizontal direction as viewed from a user A, is used as the curved screen 30 by way of example. FIG. 1 is a view of the projector system 1 from above, and the curved screen 30 is formed on an arc having a central angle of 180°. For example, the width (diameter) of the curved screen 30 is designed to be about 2-3 m. The user A views the picture projected onto the curved screen 30 from near the central point of the curved screen 30. According to such a design, the user A can gain a deep sense of immersion.

The projector system 1 includes a plurality of projector apparatuses 10 and a control apparatus 20. FIG. 1 shows an example in which four projector apparatuses 10 (a first projector apparatus 10a, a second projector apparatus 10b, a third projector apparatus 10c, and a fourth projector apparatus 10d) are used.

The plurality of projector apparatuses 10 are arranged on the rear side of the curved screen 30 as viewed from the user A and project a picture from behind the curved screen 30 toward the curved screen 30. The control apparatus 20 is an apparatus that divides each frame of an input picture spatially, providing overlapping regions and that supplies the divided pictures respectively having overlapping regions to the plurality of projector apparatuses 10, respectively.

In this embodiment, the picture that should be projected by the plurality of projector apparatuses 10 is a picture taken by an imaging apparatus 3 and transmitted to the control apparatus 20 via a network 2. Hereinafter, an example is assumed in which a live-action moving picture taken by the imaging apparatus 3 is projected onto the curved screen 30 in real time.

Figure 2:
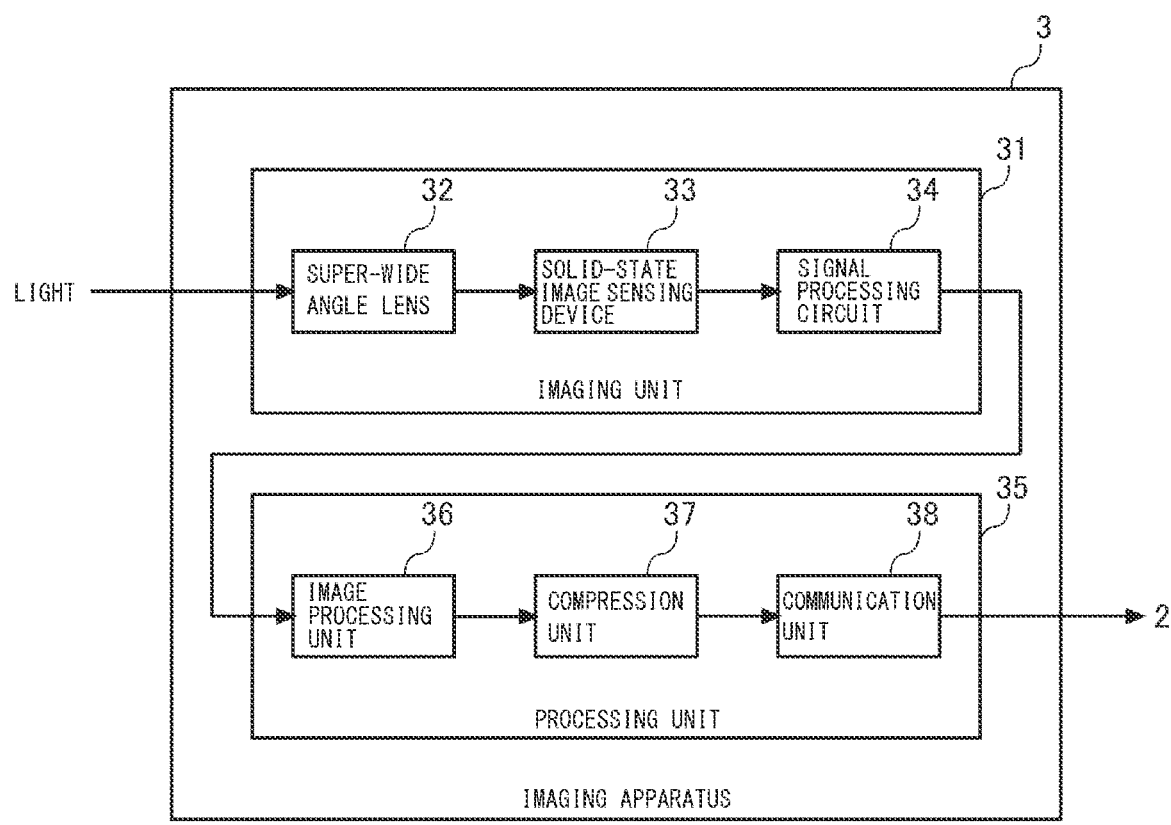
FIG. 2 shows an exemplary configuration of the imaging apparatus of FIG. 1.

FIG. 2 shows an exemplary configuration of the imaging apparatus 3 of FIG. 1. The imaging apparatus 3 includes an imaging unit 31 and a processing unit 35. The imaging unit 31 includes a super-wide angle lens 32, a solid-state image sensing device 33, and a signal processing circuit 34. The super-wide angle lens 32 is a super-wide angle lens having an field angle of 140° or greater. In this embodiment, it is assumed that a fish-eye lens having an field angle of 180° is used. It is preferred that the field angle of the super-wide angle lens 32 and the central angle of the curved screen 30 have proximate values. A fish-eye lens having a field angle of 180° or greater may be used. Further, the curved screen 30 having a central angle of 180° or greater may be used.

The solid-state image sensing device 33 converts light incident via the super-wide angle lens 32 into an image signal and outputs the image signal to the signal processing circuit 34. The solid-state image sensing device 33 outputs the image signal at a frame rate of 30 Hz/60 Hz. A complementary metal oxide semiconductor (CMOS) image sensor or a charge coupled device (CCD) image sensor may be used as the solid-state image sensing device 33. The signal processing circuit 34 subjects the image signal input from the solid-state image sensing device 33 to a signal process such as A/D conversion and noise rejection and outputs the resultant signal to the processing unit 35.

The processing unit 35 includes an image processing unit 36, a compression unit 37, and a communication unit 38. The functions of the processing unit 35 can be implemented by the coordination of hardware resources and software resources, or hardware resources alone. A CPU, ROM, RAM, graphics processing unit (GPU), digital signal processor (DSP), application specific integrated circuit (ASIC), field-programmable gate array (FPGA), and other LSIs can be used as hardware resources. Programs such as firmware can be used as software resources.

The image processing unit 36 subjects the image signal input from the signal processing circuit 34 to coordinate transform based on a distortion parameter defined in accordance with the view angle of the super-wide angle lens 32. For example, the image processing unit 36 subjects the signal to coordinate transform by using equidistant projection in which the distance from the center of the screen and the angle are proportionate. Further, the image processing unit 36 cuts out a rectangular image from a circular image generated by performing coordinate transform and generates an image signal having an ordinary aspect ratio. The image processing unit 36 can also subject the image signal to various image processes such as gray level correction, color correction, contour correction.

The compression unit 37 compresses the image signal input from the image processing unit 36 based on a predetermined compression scheme. It is preferred that a high-compression rate, visual lossless compression scheme be used. The communication unit 38 is a communication interface for connecting to the network 2 by wire or wirelessly and transmits a picture signal, including the image signal compressed by the compression unit 37, to the control apparatus 20 in accordance with a predetermined communication standard. The network 2 is a generic term for a communication channel such as the Internet, dedicated line, etc. The embodiment is non-limiting as to the communication medium, communication route, and protocol.

Figure 3:
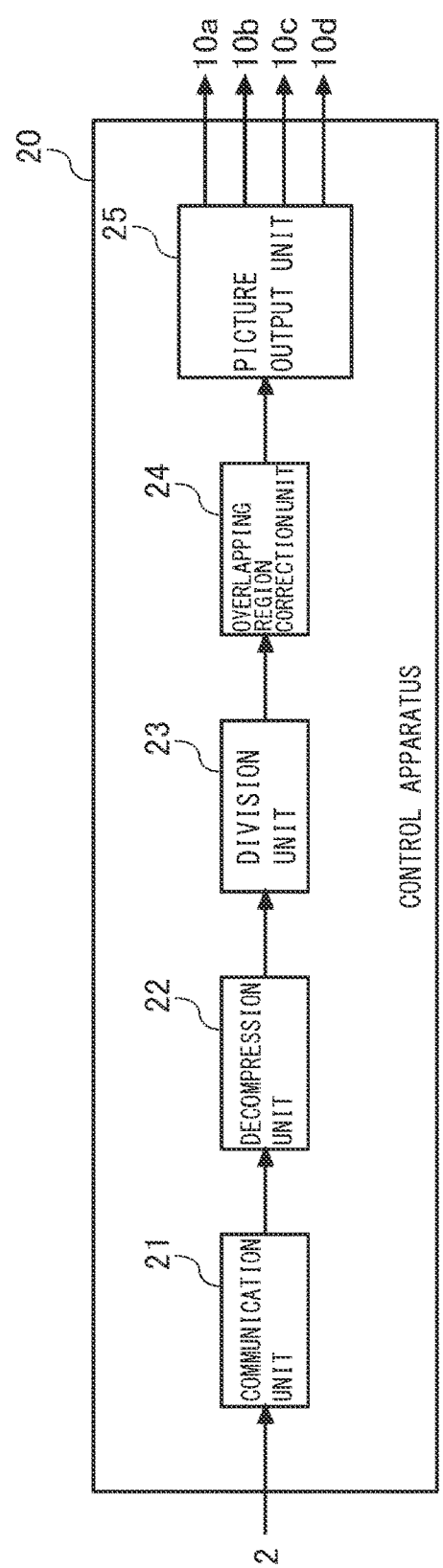
FIG. 3 shows an exemplary configuration of the control apparatus of FIG. 1.

FIG. 3 shows an exemplary configuration of the control apparatus 20 of FIG. 1. The control apparatus 20 includes a communication unit 21, a decompression unit 22, a division unit 23, an overlapping region correction unit 24, and a picture output unit 25. The functions of the control apparatus 20 can also be implemented by the coordination of hardware resources and software resources, or hardware resources alone. A CPU, ROM, RAM, GPU, DSP, ASIC, FPGA, and other LSIs can be used as hardware resources. Programs such as firmware can be used as software resources.

FIG. 1 shows an example in which the control apparatus 20 is configured as an apparatus independent of the plurality of projector apparatuses 10. The control apparatus 20 is connected to the plurality of projector apparatuses 10 by cables (e.g., HDMI (registered trademark) cables, LAN cables). The control apparatus 20 and the plurality of projector apparatuses 10 may be connected wirelessly.

The control apparatus 20 may not be configured as an apparatus independent of the plurality of projector apparatuses 10. A board on which the control apparatus 20 is mounted may be built in one of the plurality of projector apparatuses 10. In that case, the projector apparatus 10 having the control apparatus 20 built therein is connected to the other projector apparatuses 10 by wire or wirelessly.

The communication unit 21 is a communication interface for connecting to the network 2 by wire or wirelessly and receives the picture signal transmitted from the imaging apparatus 3 in accordance with a predetermined communication standard. The decompression unit 22 decompresses the received picture signal in accordance with a decompression scheme compatible with the compression scheme in the imaging apparatus 3.

The division unit 23 divides the picture signal input from the decompression unit 22 into picture signals, the number of picture signals being equal to the number of plurality of projector apparatuses 10. In this embodiment, the input picture is divided into four in the horizontal direction. In that process, overlapping regions are provided at the boundaries between the pictures. In other words, the pictures are cut out from the original input picture in such a manner that redundant portions are provided at the boundaries of the pictures. The size of the overlapping region between two adjacent pictures depends on the mode of installation of the plurality of projector apparatuses 10 described later.

The overlapping region correction unit 24 corrects, in the plurality of pictures resulting from the division, the brightness of two adjacent pictures in the overlapping region in accordance with the respective blending proportions. In the simplest process, the brightness of two pictures in the overlapping region is defined to have a ratio 1:1. The brightness of each picture in the overlapping region is corrected by multiplying it by 0.5 so that the total of the blending proportions is 1 in the overlapping region between the two pictures. Blending proportions that result in graded brightness in the overlapping region may be defined. For example, the brightness may be graded such that the left picture and the right picture in the overlapping region are blended at a ratio 1:0 at the left end of the overlapping region and 0:1 at the right end.

In the case the number of the plurality of projector apparatuses 10 is large, three adjacent pictures may form an overlapping region. In that case, too, the brightness of each picture in the overlapping region is corrected so that the total of the blending proportions is 1 in the overlapping region between the three pictures.

The picture output unit 25 outputs the plurality of pictures for which the overlapping region is corrected and which result from the division to the plurality of projector apparatuses 10, respectively. In the example shown in FIG. 1, the four pictures from the division are output to the four projector apparatuses 10, respectively.

Figure 4:
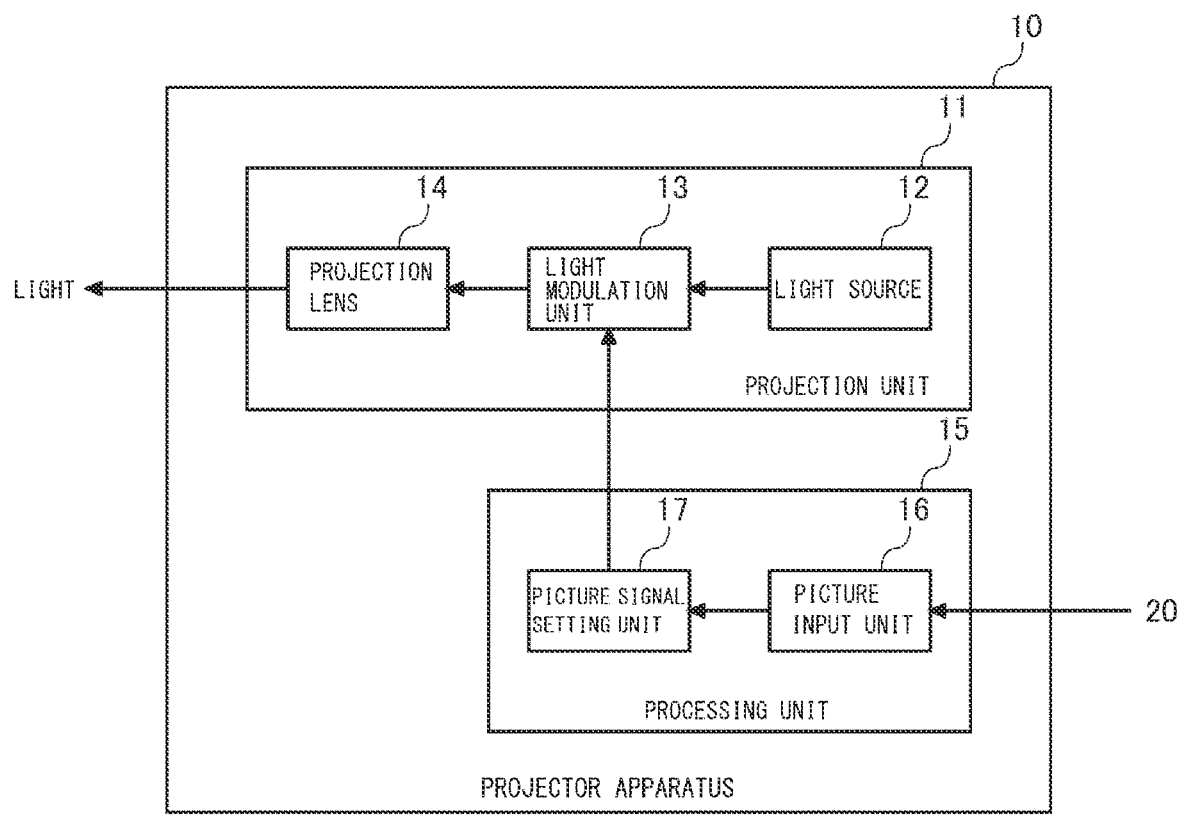
FIG. 4 shows an exemplary configuration of the projector apparatus of FIG. 1.

FIG. 4 shows an exemplary configuration of the projector apparatus 10 of FIG. 1. The projector apparatus 10 includes a projection unit 11 and a processing unit 15. The projection unit 11 includes a light source 12, a light modulation unit 13, and a projection lens 14. The processing unit 15 includes a picture input unit 16 and a picture signal setting unit 17. The functions of the processing unit 15 can also be implemented by the coordination of hardware resources and software resources, or hardware resources alone. A CPU, ROM, RAM, GPU, DSP, ASIC, FPGA, and other LSIs can be used as hardware resources. Programs such as firmware can be used as software resources.

The picture is input to the picture input unit 16 from the control apparatus 20. The picture signal setting unit 17 sets the input picture signal in the light modulation unit 13.

A halogen lamp, xenon lamp, metal halide lamp, super high-pressure mercury lamp, laser diode, etc. can be used in the light source 12.

The light modulation unit 13 modulates light incident from the light source 12 in accordance with the picture signal set by the picture signal setting unit 17. A liquid crystal display (LCD) system, liquid crystal on silicon (LCoS) system, digital light processing (DLP) system, etc. is used in the light modulation unit 13. In an LCD system, a three-primary color transmissive liquid crystal panel is used, and pictures generated by the transmissive liquid crystal panels of the respective colors are blended and projected. In an LCoS system, a three-primary color reflective liquid crystal panel is used, and pictures generated by the reflective liquid crystal panels of the respective colors are blended and projected. In a DLP system, a digital micromirror device (DMD) is used. A DMD is provided with a plurality of micromirrors corresponding to the number of pixels. A desired picture is generated by controlling the orientation of each micromirror in accordance with each picture signal.

The projection lens 14 magnifies and outputs light incident from light modulation unit 13. A lens having an ordinary field angle is used as the projection lens 14, and a fish-eye lens or a special lens optimized to the curvature of the curved screen 30 is not used.

The arrangement of the plurality of projector apparatuses 10 will be considered below. First, for simplicity, a case in which two projector apparatuses 10 (the first projector apparatus 10a, the second projector apparatus 10b) are used will be discussed.

Figure 5:
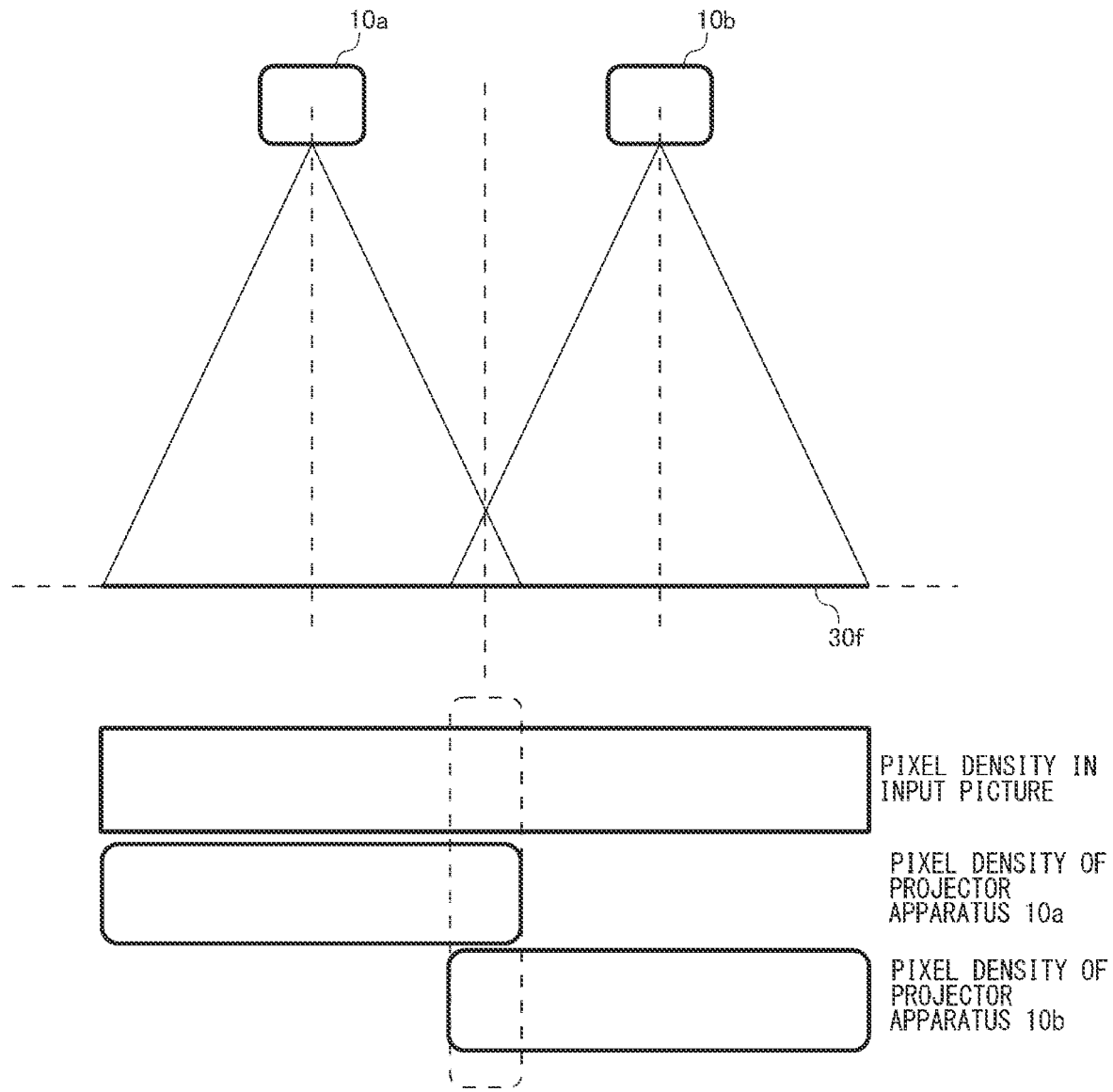
FIG. 5 shows an exemplary arrangement 1 involving two projector apparatuses.

FIG. 5 shows an exemplary arrangement 1 involving two projector apparatuses 10. The exemplary arrangement 1 is an example in which a flat screen 30f is used instead of the curved screen 30. Instead of a picture taken by using the super-wide angle lens 32 shown in FIG. 2, a picture taken by using a normal lens is used as a pre-division input picture. The picture taken by using a normal lens has a substantially uniform pixel density within the screen. Meanwhile, the pixel density (resolution) of a picture taken by using the super-wide angle lens 32 drops from the center toward the periphery. In other words, the pixel size is smallest at the center of the picture, and the pixel size is largest at the end of the screen.

The smaller the distance between the projector apparatus 10 and the projection surface, the higher the pixel density (resolution) of the projected picture, i.e., the smaller the pixel size. Further, the smaller the distance, the brighter the picture. Conversely, the larger the distance between the projector apparatus 10 and the projection surface, the lower the pixel density (resolution) of the projected picture, i.e., the larger the pixel size. Further, the larger the distance, the darker the picture.

In the example shown in FIG. 5, the first projector apparatus 10a and the second projector apparatus 10b are arranged such that the light axis of each projected light is perpendicular to the projection surface of the flat screen 30f. The distance from the projecting position of the first projector apparatus 10a to each projected position on the flat screen 30f is larger toward the periphery. Strictly speaking, therefore, the picture projected from the first projector apparatus 10a onto the flat screen 30f will have a lower pixel density and will be darker toward the periphery. However, the difference in pixel density and brightness between the central part and the peripheral part of the screen is negligible, and the distribution of pixel density and brightness within the screen can be said to be substantially uniform. The same is true of the picture projected from the second projector apparatus 10b onto the flat screen 30f.

As described above, the pixel density in the pre-division input picture is also substantially uniform so that the pixel density in the whole picture projected from the first projector apparatus 10a and the second projector apparatus 10b onto the flat screen 30f will also be substantially uniform.

Figure 6:
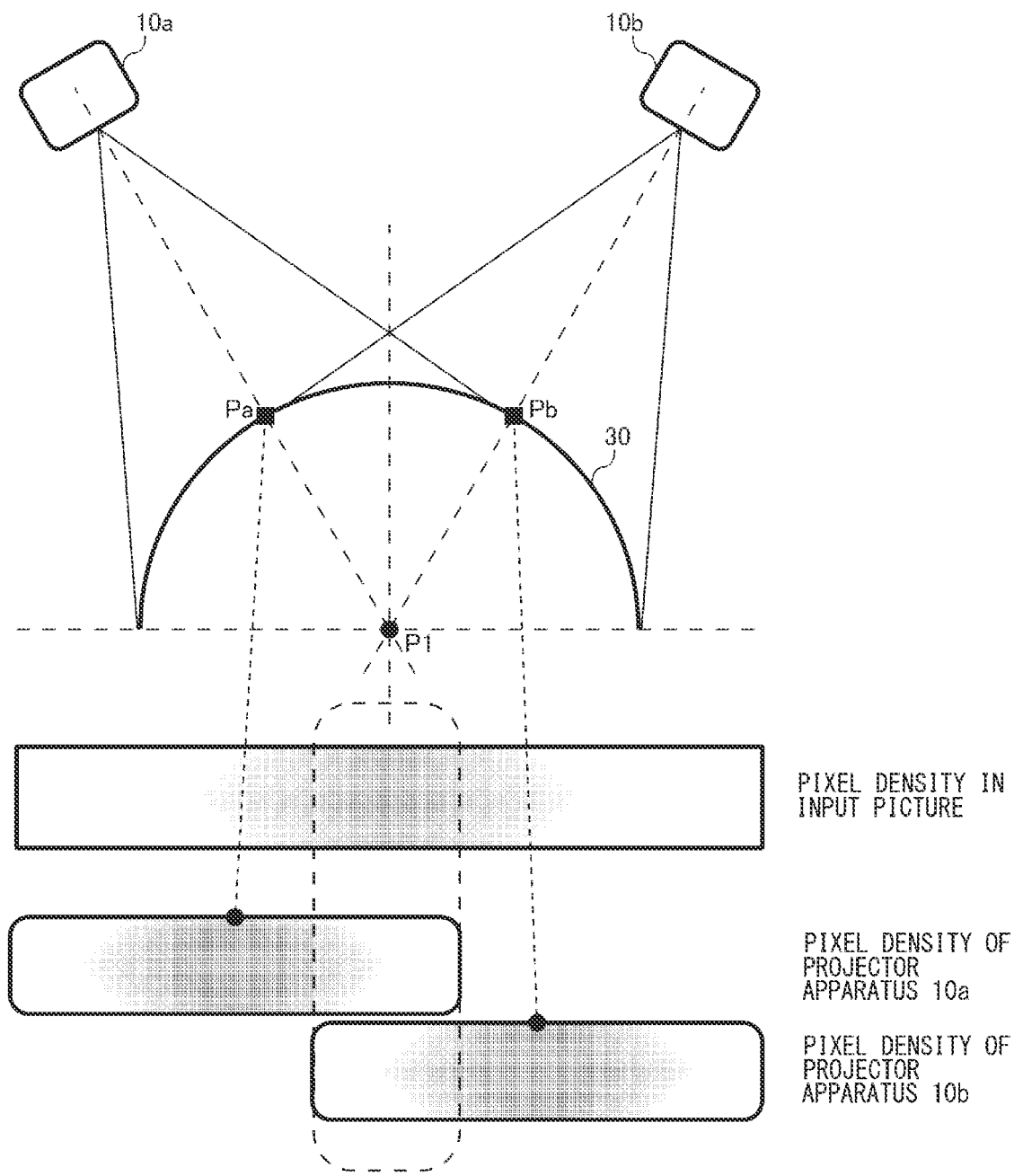
FIG. 6 shows an exemplary arrangement 2 involving two projector apparatuses.

FIG. 6 shows an exemplary arrangement 2 involving two projector apparatus 10. In the exemplary arrangement 2 and the subsequent arrangements, the curved screen 30 is used instead of the flat screen 30f. A picture taken by using the super-wide angle lens 32 shown in FIG. 2 is used as a pre-division input picture.

The central point of the arc of the curved screen 30 is defined as a central point P1 of the curved screen 30. The example shown in FIG. 6 is an example in which the first projector apparatus 10a and the second projector apparatus 10b are arranged at equal intervals from the curved screen 30. The plurality of projector apparatuses 10 are arranged such that the optical axis of light projected from the plurality of projector apparatuses 10 are arranged to result in equal intervals on the curved screen 30, the interval being defined by an angle derived from dividing the central angle of the curved screen 30 by (the number of the projector apparatuses 10+1). More specifically, the projecting positions of the plurality of projector apparatuses 10 are set such that the optical axis of light projected from the plurality of projector apparatuses 10 intersect at the central point P1 of the curved screen 30, the optical axis of light projected from the plurality of projector apparatuses 10 impinge upon the projection surface of the curved screen 30 to result in equal angular intervals, and the projection distances from the projecting positions of the respective projector apparatuses 10 to positions (Pa, Pb) where the optical axis of the respective projected light rays impinge upon the projection surface are equal.

In the example shown in FIG. 6, the central angle of the curved screen 30 is 180°, and the number of the projector apparatuses 10 is 2. Therefore, the projecting positions of the first projector apparatus 10a and the second projector apparatus 10b are set such that the optical axis of light projected from the first projector apparatus 10a and the second projector apparatus 10b intersect at the central point P1 of the curved screen 30, the optical axis of light projected from the first projector apparatus 10a and the second projector apparatus 10b impinge upon the projection surface of the curved screen 30 at the positions (Pa, Pb), forming an interval of 60°, and the projection distances from the respective projecting positions of the first projector apparatus 10a and the second projector apparatus 10b to the positions (Pa, Pb) where the optical axis of the respective projected light rays impinge upon the projection surface are equal.

The three bands at the bottom of FIG. 6 schematically represent the pixel density in the input picture, the pixel density in the picture created by light projected from the first projector apparatus 10a onto the curved screen 30, and the pixel density in the picture created by light projected from the second projector apparatus 10b onto the curved screen 30, respectively.

The input picture is a picture taken by using a fish-eye lens. Therefore, the pixel density is highest in the central part and decreases toward the periphery. The pixel density in the picture projected from the first projector apparatus 10a is highest at the position where the light axis of light projected from the first projector apparatus 10a impinges upon the projection surface of the curved screen 30 and decreases away from that position left or right. Similarly, the pixel density in the picture projected from the second projector apparatus 10b is highest at the position where the light axis of the light projected from the second projector apparatus 10b impinges upon the projection surface of the curved screen 30 and decreases away from that position left or right.

In the example shown in FIG. 6, two peaks (regions where the pixel density in the horizontal direction is relatively high) are produced in the picture projected onto the entirety of the curved screen 30. The pixel density in the central part between the two peaks is lower than the pixel density at the two peak portions. The two peaks in the pixel density correspond to the positions (Pa, Pb) where the optical axis of the respective projector apparatuses 10 impinge upon the projection surface. In contrast, the pixel density in the input picture is highest in the central part. Therefore, a considerable disagreement is produced between the distribution of pixel density in the input picture and the distribution of pixel density in the picture projected onto the entirety of the curved screen 30. The distribution of pixel density also corresponds to the distribution of brightness, and the brightness of the picture projected onto the entirety of the curved screen 30 in the central part is darker less than the brightness at the two peak portions on both sides.

Human eyes are sensitive to pictures in a view angle range of about 30° around the direction of sight. A drop in the resolution and brightness in the central part of the curved screen 30 is highly noticeable to the user A viewing the central part of the curved screen 30, which can be a factor to reduce the sense of immersion.

Figure 7:
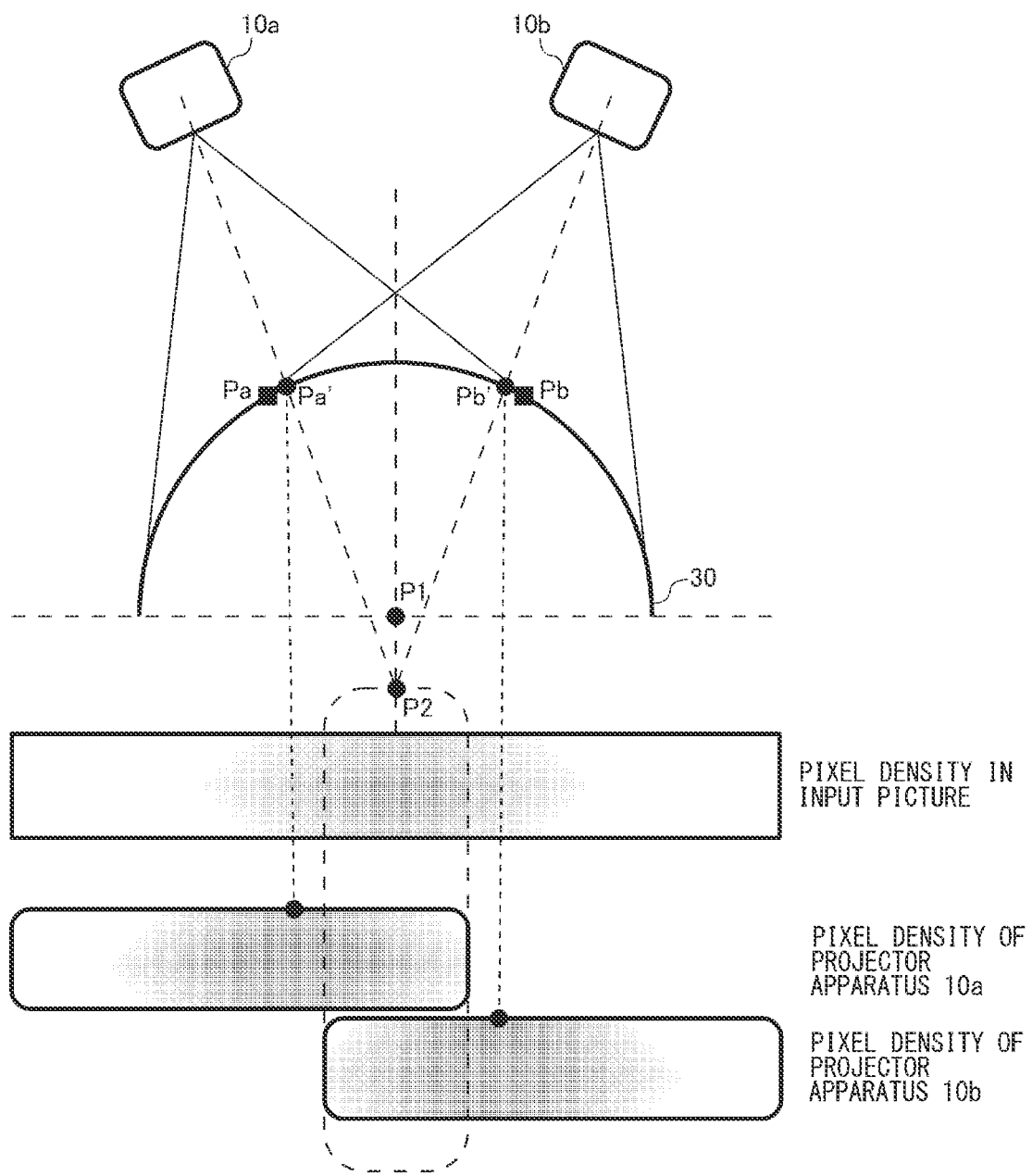
FIG. 7 shows an exemplary arrangement 3 involving two projector apparatuses.

FIG. 7 shows an exemplary arrangement 3 involving two projector apparatuses 10. In the exemplary arrangement 3, the projecting positions of the first projector apparatus 10a and the second projector apparatus 10b are set such that the pixel density in the central part of the picture projected onto the entirety of the curved screen 30 is higher than the pixel density at the peripheral part.

In order to realize the above arrangement, the plurality of projector apparatuses 10 are placed in an offset arrangement so that the plurality of projector apparatuses 10 are as close as possible to the center of the curved screen 30 without causing a flaw in the image such as vignetting. In this case, the optical axis of light projected by the plurality of projector apparatuses 10 intersect at an intersection P2 farther than the central point P1 of the curved screen 30 as viewed from the plurality of projector apparatuses 10. More specifically, the intersection P2 is located on an extension of a line connecting the center on the projection surface of the curved screen 30 and the central point P1. Further, positions (Pa', Pb') where the optical axis of light projected by the plurality of projector apparatuses 10 impinge upon the projection surface of the curved screen 30 are closer to the center on the projection surface than the positions (Pa, Pb) where the plurality of optical axis impinge upon the projection surface of the curved screen 30 to result in equal angular intervals. The positions (Pa', Pb') where the optical axis of light projected by the plurality of projector apparatuses 10 impinge upon the projection surface of the curved screen 30 may be the same as the positions (Pa, Pb) where the plurality of optical axis impinge upon the projection surface of the curved screen 30 to result in equal angular intervals, provided that the optical axis of light projected by the plurality of projector apparatuses 10 intersect at the intersection P2.

In the example shown in FIG. 7, the optical axis of light projected by the first projector apparatus 10a and the second projector apparatus 10b intersect at the intersection P2 farther than the central point P1 of the curved screen 30. Further, the positions (Pa', Pb') where the optical axis of light projected by the first projector apparatus 10a and the second projector apparatus 10b impinge upon the projection surface of the curved screen 30 are closer to the center on the projection surface than the two positions (Pa, Pb) where the two optical axis impinge upon the projection surface to result in equal angular intervals. Therefore, the angle formed by the light axis of light projected by the first projector apparatus 10a and the light axis of light projected by the second projector apparatus 10b is less than 60°.

Figure 8:
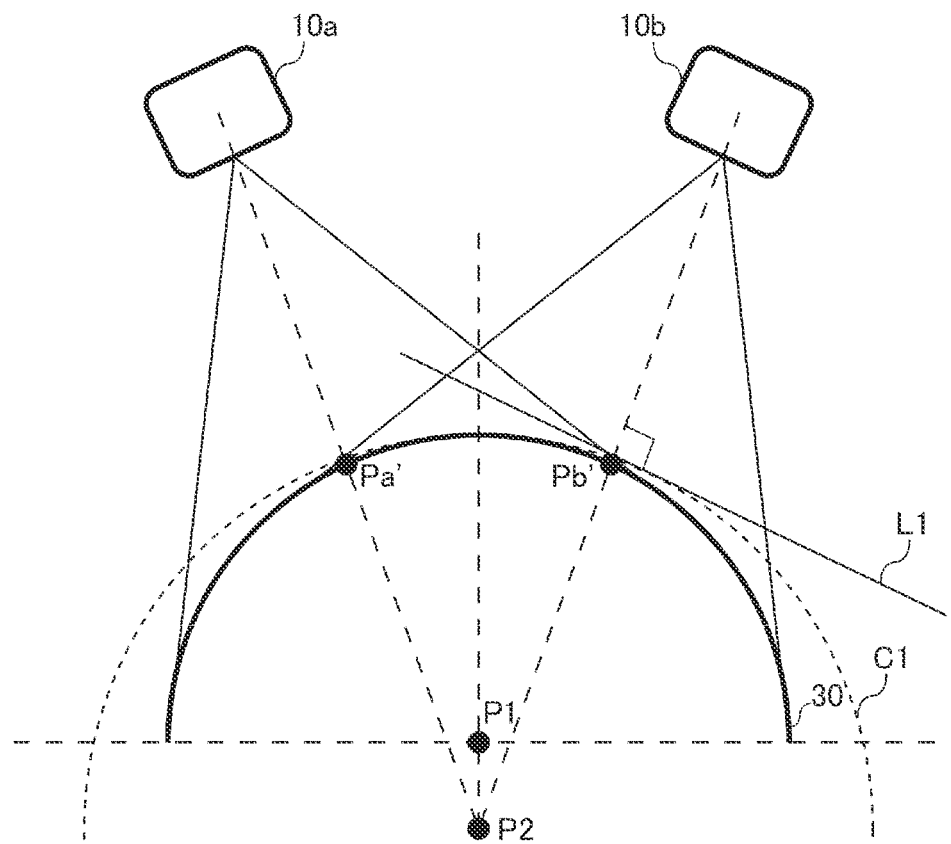
FIG. 8 is a figure for illustrating a condition for optical axis of light projected by the projector apparatuses in the exemplary arrangement 3 of FIG. 7.

As shown in FIG. 8, the optical axis of light projected by the first projector apparatus 10a and the second projector apparatus 10b, respectively, are perpendicular to a tangential line L1 of an arc of a circle C1 centered at the intersection P2 of the optical axis of the two projected light rays. The tangential line L1 contacts the circle C1 at intersections between the optical axis of light projected by the first projector apparatus 10a and the second projector apparatus 10b, respectively, and the circle C1 centered at the intersection P2 of the optical axis of the two projected light rays.

Figure 9:
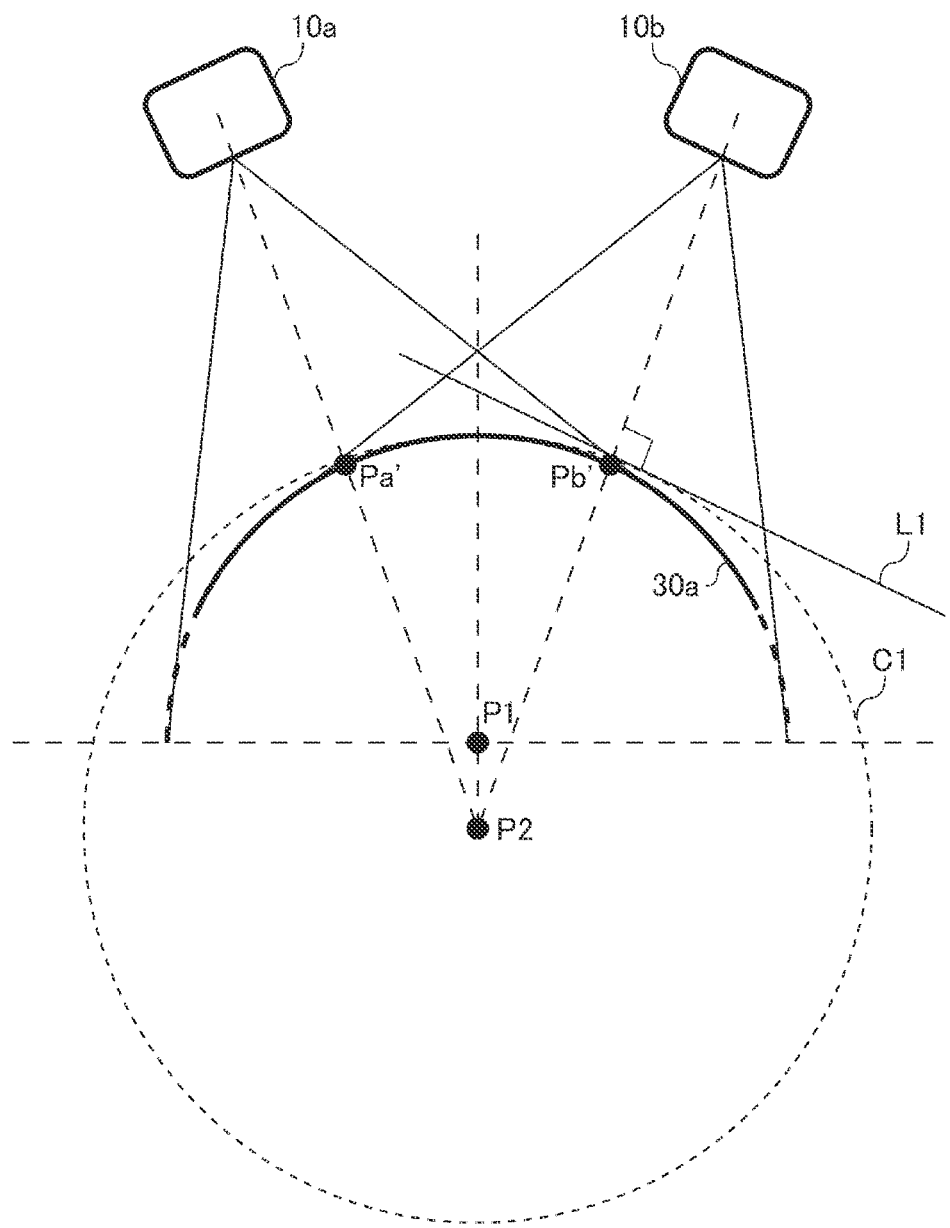
FIG. 9 is another figure for illustrating a condition for optical axis of light projected by the projector apparatuses in the exemplary arrangement 3 of FIG. 7.

As shown in FIG. 9, even if a curved screen 30a indicated by the solid line is an arc having a central angle less than 180°, the optical axis of light projected by the first projector apparatus 10a and the second projector apparatus 10b, respectively, are, under the same condition as shown in FIG. 8, perpendicular to the tangential line L1 of the arc of the circle C1 centered at the intersection P2 of the optical axis of the two projected light rays. The tangential line L1 contacts the circle C1 at intersections between the optical axis of light projected by the first projector apparatus 10a and the second projector apparatus 10b, respectively, and the circle C1 centered at the intersection P2 of the optical axis of the two projected light rays.

The curved screen need not be a circular arc. The curved screen may be an arc of an ellipse. In the case the curved screen is an arc of an ellipse, the intersection between the longer axis and the shorter axis of the ellipse is defined as the central point P1 of the curved screen.

Comparing the bands of FIG. 6 and FIG. 7 showing the pixel density in the picture projected from the first projector apparatus 10a, the region with the highest pixel density is located more toward the center of the picture projected onto the entirety of the curved screen 30 in the example shown in FIG. 7 than in FIG. 6. In other words, FIG. 7 shows that the region is located rightward. Similarly, comparing the bands of FIG. 6 and FIG. 7 showing the pixel density in the picture projected from the second projector apparatus 10b, the region with the highest pixel density is located more toward the center of the picture projected onto the entirety of the curved screen 30 in the example shown in FIG. 7 than in FIG. 6. In other words, FIG. 7 shows that the region is located leftward.

By configuring the angle formed by the light axis of light projected by the first projector apparatus 10a and the light axis of light projected by the second projector apparatus 10b to be smaller, the region with the highest pixel density in the picture projected from the first projector apparatus 10a and the region with the highest pixel density in the picture projected from the second projector apparatus 10b can be brought closer to the center.

In the example shown in FIG. 7, the distribution of pixel density in the picture projected onto the entirety of the curved screen 30 is closer to the distribution of pixel density in the input picture than in the example shown in FIG. 6. Therefore, a picture having a resolution and brightness similar to those of the picture taken by the imaging apparatus 3 can be projected. Therefore, the sense of immersion of the user A can be improved.

Figure 10:
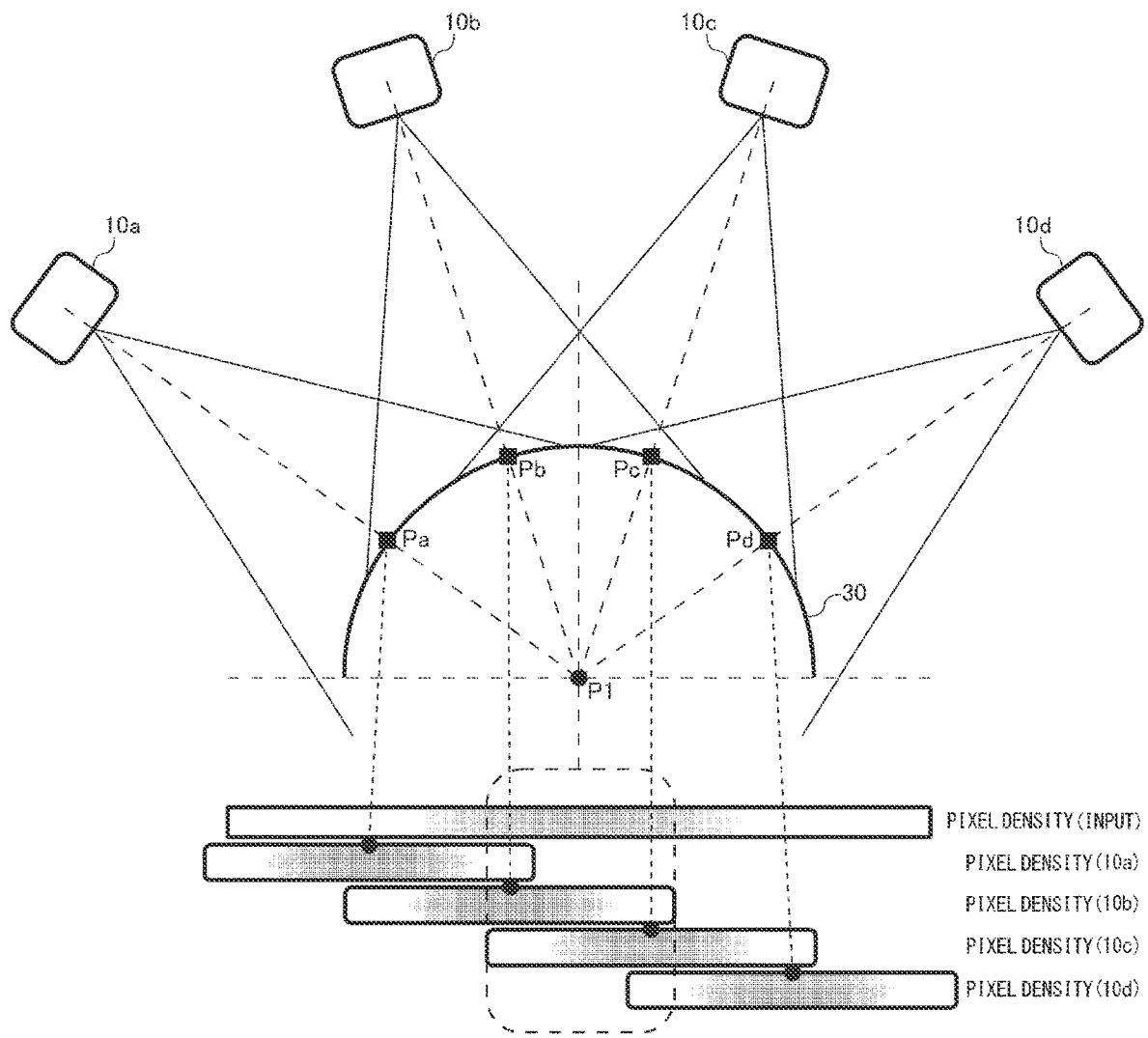
FIG. 10 shows an exemplary arrangement 4 involving four projector apparatuses.

FIG. 10 shows an exemplary arrangement 4 involving four projector apparatuses 10. The exemplary arrangement 4 is an example in which the first projector apparatus 10a, the second projector apparatus 10b, the third projector apparatus 10c, and the fourth projector apparatus 10d are arranged at equal intervals relative to the curved screen 30. In the example shown in FIG. 10, the central angle of the curved screen 30 is 180°, and the number of the projector apparatuses 10 is 4. Therefore, the projecting positions of the first projector apparatus 10a, the second projector apparatus 10b, the third projector apparatus 10c, and the fourth projector apparatus 10d are set such that the optical axis of light projected by the first projector apparatus 10a, the second projector apparatus 10b, the third projector apparatus 10c, and the fourth projector apparatus 10d intersect at the central point P1 of the curved screen 30, the optical axis of light projected by the first projector apparatus 10a, the second projector apparatus 10b, the third projector apparatus 10c, and the fourth projector apparatus 10d impinge upon the projection surface of the curved screen 30 at intervals of 36°, and the projection distances from the respective projecting positions of the first projector apparatus 10a, the second projector apparatus 10b, the third projector apparatus 10c, and the fourth projector apparatus 10d to positions (Pa, Pb, Pc, Pd) where the optical axis of the respective projected light rays impinge upon the projection surface are equal.

The five bands at the bottom of FIG. 10 schematically represent the pixel density in the input picture, the pixel density in the picture created by light projected by the first projector apparatus 10a onto the curved screen 30, the pixel density in the picture created by the light projected from the second projector apparatus 10b onto the curved screen 30, the pixel density in the picture created by the light projected from the third projector apparatus 10c onto the curved screen 30, and the pixel density in the picture created by the light projected from the fourth projector apparatus 10d onto the curved screen 30, respectively.

In the example shown in FIG. 10, four peaks (regions where the pixel density in the horizontal direction is relatively high) are produced in the pixel density in the picture projected onto the entirety of the curved screen 30. The four peaks in the pixel density correspond to the positions (Pa, Pb, Pc, Pd) where the optical axis of the respective projector apparatuses 10 impinge upon the projection surface. The pixel density in the valley portion between two adjacent peaks is lower than the pixel density at the two peak portions. Thus, the pixel density in the picture projected onto the entirety of the curved screen 30 has unnatural variation. Likewise, the brightness has unnatural variation.

Figure 11:
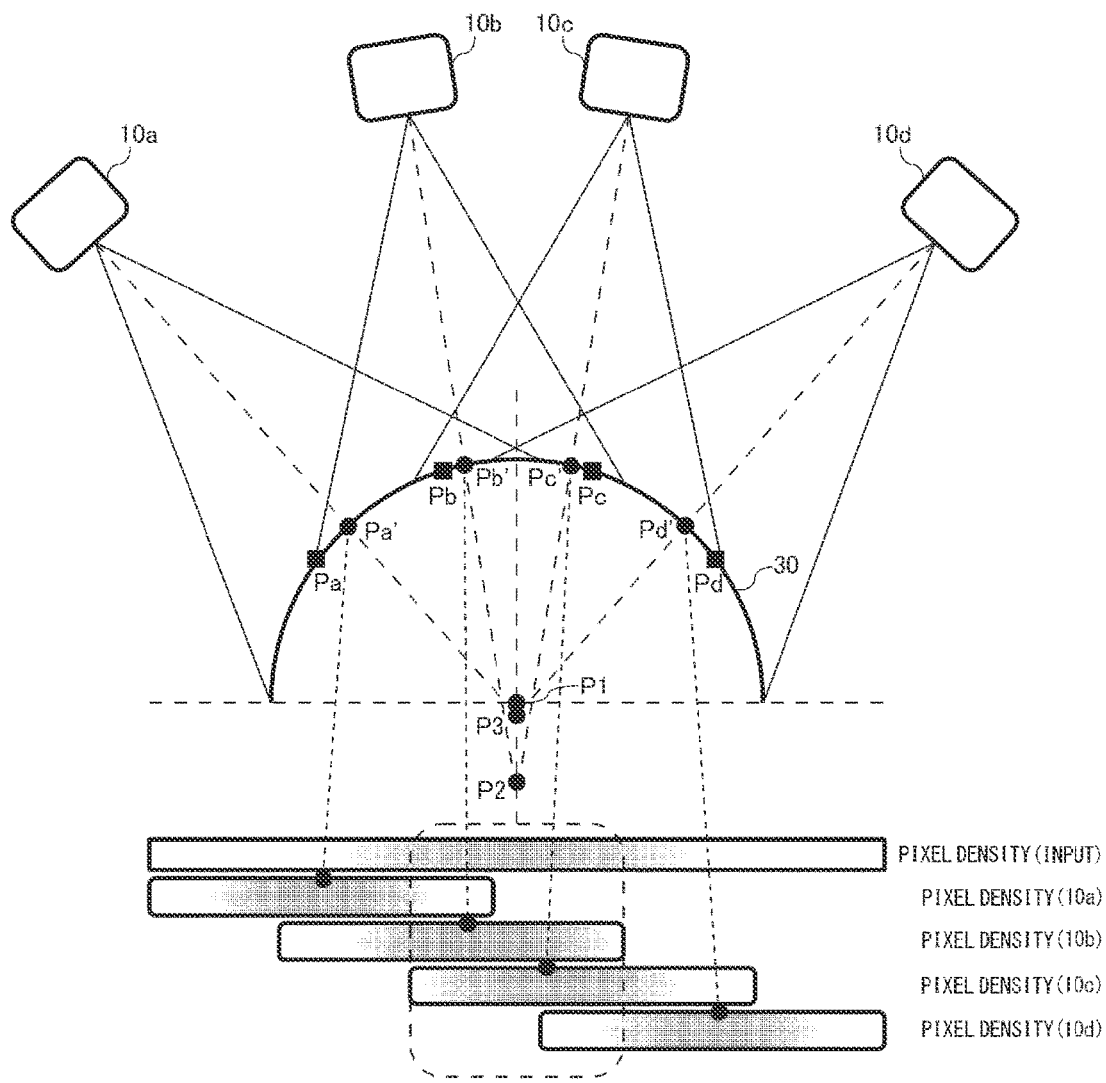
FIG. 11 shows an exemplary arrangement 5 involving four projector apparatuses.

FIG. 11 shows an exemplary arrangement 5 involving four projector apparatuses 10. In the exemplary arrangement 5, the projecting positions of the first projector apparatus 10a, the second projector apparatus 10b, the third projector apparatus 10c, and the fourth projector apparatus 10d are set such that the pixel density in the central part of the picture projected onto the entirety of the curved screen 30 is higher than the pixel density at the peripheral part.

In the example shown in FIG. 11, positions (Pa', Pb', Pc', Pd') where the optical axis of light projected from the first projector apparatus 10a, the second projector apparatus 10b, the third projector apparatus 10c, and the fourth projector apparatus 10d impinge upon the projection surface of the curved screen 30 are closer to the center on the projection surface than the four positions (Pa, Pb, Pc, Pd) where the four optical axis impinge upon the projection surface at equal angular intervals.

It is preferred that the closer to the center on the projection surface, the smaller the angle formed by the optical axis of the two projection light rays of the two adjacent projector apparatuses 10 set. In the example shown in FIG. 11, the angle formed by the light axis of light projected by the second projector apparatus 10b and the light axis of light projected by the third projector apparatus 10c is configured to be smaller than the angle formed by the light axis of light projected by the first projector apparatus 10a and the light axis of light projected by the second projector apparatus 10b or the angle formed by the light axis of light projected by the third projector apparatus 10c and the light axis of light projected by the fourth projector apparatus 10d.

In the example shown in FIG. 11, the projection distance from the respective projecting positions of the second projector apparatus 10b and the third projector apparatus 10c, which project light onto the central part of the curved screen 30, to the positions (Pb', Pc') where the optical axis of the respective projected light rays impinge upon the projection surface are configured to be smaller than the projection distance from the respective projecting positions of the first projector apparatus 10a and the fourth projector apparatus 10d, which project light onto the peripheral part of the curved screen 30, to the positions (Pa', Pd') where the optical axis of the respective projected light rays impinge upon the projection surface. As described above, the smaller the distance, the higher the pixel density and brightness of the projected picture.

In the example shown in FIG. 11, the optical axis of light projected by the second projector apparatus 10b and the third projector apparatus 10c, which project light onto the central part of the curved screen 30, intersect at the intersection P2 farther than the central point P1 of the curved screen 30 as viewed from the respective projector apparatuses 10. The optical axis of light projected by the first projector apparatus 10a and the fourth projector apparatus 10d, which project light onto the peripheral part of the curved screen 30, intersect at an intersection P3 nearer than the intersection P2 between the optical axis of light projected by the second projector apparatus 10b and the third projector apparatus 10c and farther than the central point P1 of the curved screen 30, as viewed from the respective projector apparatuses 10. The position of the intersection P3 depends on the projection distance of the projector apparatuses 10 described above. The intersection P2 and the intersection P3 are located on an extension of a line connecting the center on the projection surface of the curved screen 30 and the central point P1.

The positions (Pa', Pb', Pc', Pd') where the optical axis of light projected from the plurality of projector apparatuses 10 impinge upon the projection surface of the curved screen 30 may be the same as the positions (Pa, Pb, Pc, Pd) where the plurality of optical axis impinge upon the projection surface of the curved screen 30 at equal angular intervals, provided that the optical axis of light projected by the plurality of projector apparatuses 10 intersect at a point farther than the central point P1.

Figure 12:
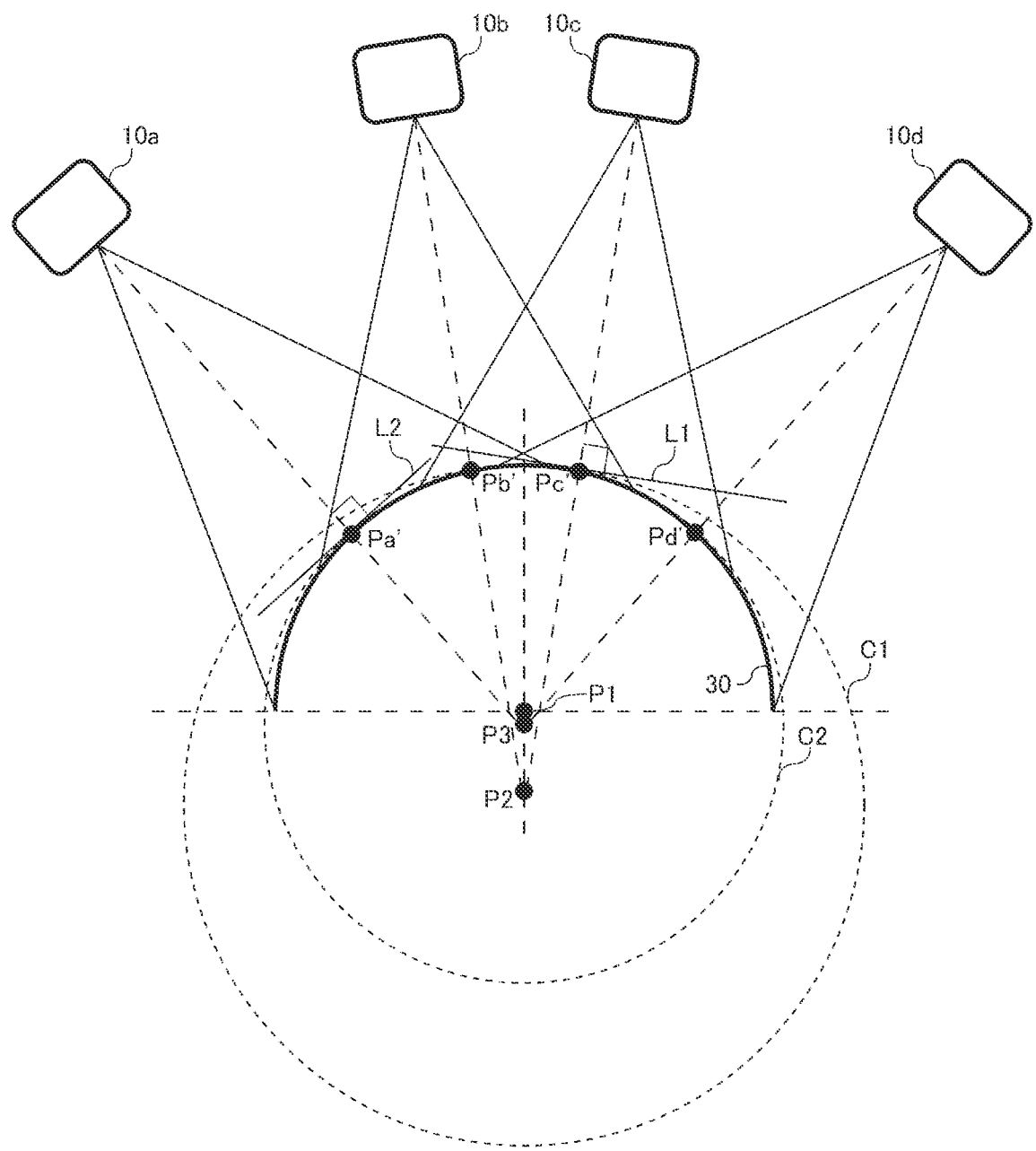
FIG. 12 is a diagram for illustrating a condition for optical axis of light projected by the projector apparatuses in the exemplary arrangement 5 of FIG. 11.

As shown in FIG. 12, the optical axis of light respectively projected by the second projector apparatus 10b and the third projector apparatus 10c, which project light onto the central part of the screen, are perpendicular to the tangential line L1 of the arc of the circle C1 centered at the intersection P2 of the optical axis of the two projected light rays. The tangential line L1 contacts the circle C1 at intersections between the optical axis of light projected by the second projector apparatus 10b and the third projector apparatus 10c, respectively, and the circle C1 centered at the intersection P2 of the optical axis of the two projected light rays. The optical axis of light respectively projected by the first projector apparatus 10a and the fourth projector apparatus 10d, which project light onto the edge part of the screen, are perpendicular to a tangential line L2 of an arc of a circle C2 centered at the intersection P3 of the optical axis of the two projected light rays. The tangential line L2 contacts the circle C2 at intersections between the optical axis of light projected by the first projector apparatus 10a and the fourth projector apparatus 10d, respectively, and the circle C2 centered at the intersection P3 of the optical axis of the two projected light rays. A similar relationship holds even if the number of projector apparatuses 10 increases.

Comparing the bands of FIG. 10 and FIG. 11 showing the pixel density in the pictures projected from the first projector apparatus 10a, the second projector apparatus 10b, the third projector apparatus 10c, and the fourth projector apparatus 10d, the region with the highest pixel density is located more toward the center of the picture projected onto the entirety of the curved screen 30 in the example shown in FIG. 11 than in FIG. 10.

In the example shown in FIG. 11, the distribution of pixel density in the picture projected onto the entirety of the curved screen 30 is closer to the distribution of pixel density in the input picture than in the example shown in FIG. 10. Therefore, a picture having a resolution and brightness close to those of the picture taken by the imaging apparatus 3 can be projected. Therefore, the sense of immersion of the user A can be improved.

Figure 13A:
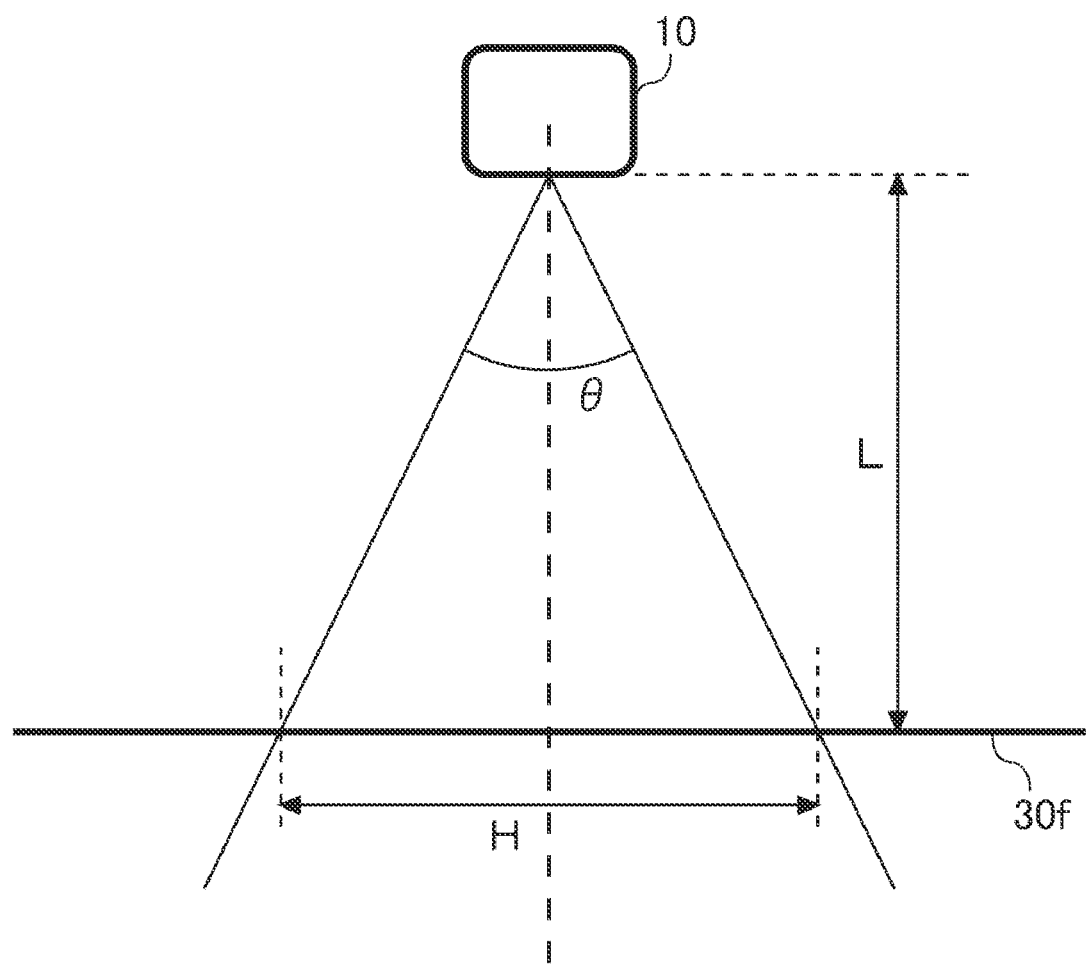
FIGS. 13A and 13B show the relationship between the pixel density in the picture projected from the projector apparatus and the projection distance.
Figure 13B:
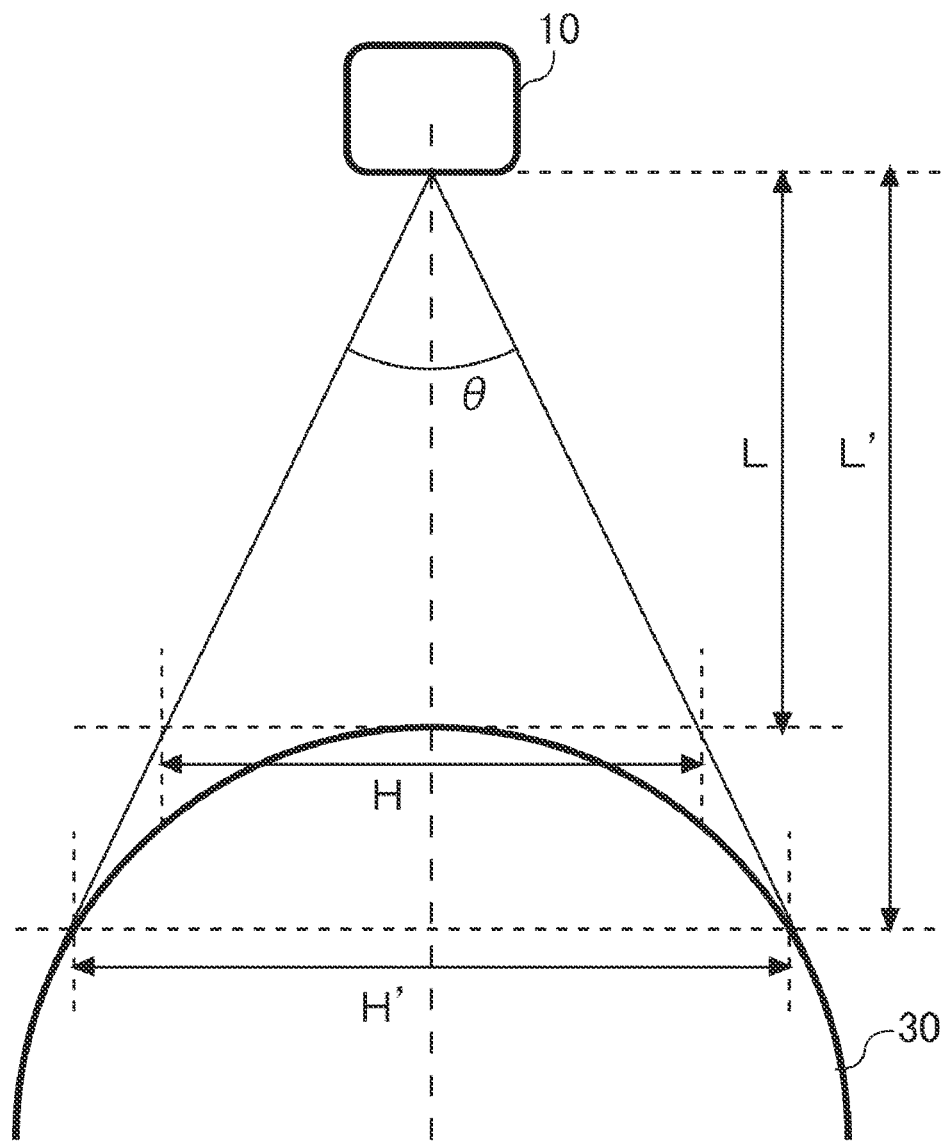

FIGS. 13A and 13B show the relationship between the pixel density in the picture projected from the projector apparatus 10 and the projection distance. FIG. 13A shows an example in which light is projected onto a flat screen 30f, and FIG. 13B shows an example in which light is projected onto a curved screen 30.

Denoting, in FIG. 13A, the projection distance of the projector apparatus 10 by L, the length of the projection range on the flat screen 30f in the horizontal direction by H, and the projection angle of the projector apparatus 10 by θ, the relationship given by the following expression (1) holds.

$$H/2 = L*\tan(\theta/2) \tag{1}$$

Denoting, in FIG. 13B, the distance (first projection distance) between the central position (first projected position) where light projected by the projector apparatus 10 impinges upon the cylindrical projection surface of the curved screen 30 and the projecting position of the projector apparatus 10 by L, the horizontal length of the projection range of light projected by the projector apparatus 10 at the point of the first projection distance by H, and the projection angle of the projector apparatus 10 by θ, the relationship given by the following expression (2) holds.

Denoting, in FIG. 13B, the distance (second projection distance) between a position derived from parallel shift of the extreme end position (second projected position) where light projected by the projector apparatus 10 impinges upon the cylindrical projection surface of the curved screen 30 and the projecting position of the projector apparatus 10 by L', the horizontal length of the projection range of light projected by the projector apparatus 10 at the point of the second projection distance by H', and the projection angle of the projector apparatus 10 by θ, the relationship given by the following expression (3) holds.

$$H/2 = L*\tan(\theta/2) \tag{2}$$

$$H'/2 = L'*\tan(\theta/2) \tag{3}$$

Denoting the number of pixels in the picture projected from the projector apparatus 10 in the horizontal direction by X, the pixel density P on a flat surface like the flat screen 30f in the horizontal direction is given by the following expression (4).

$$P = X/H = X/(2*L*\tan(\theta/2)) \tag{4}$$

The pixel density ratio between the pixel density at the center of the cylindrical projection surface like the curved screen 30 and the pixel density at the edge is inversely proportionate to the projection distance ratio (L'/L) of the second projection distance L' relative to the first projection distance L.

In other words, given an input picture such as one that is taken by a fish-eye lens in which the pixel density drops from the center toward the periphery, it is possible to display the picture such that the resolution in the input picture is inhibited from dropping, by placing a plurality of projector apparatuses 10 in an offset arrangement and by configuring the projection distance ratio to be smaller near the center and larger toward the periphery. Referring to FIG. 13B, it is assumed that the variation characteristic of pixel density in the input picture is such that the pixel density at the edge is 0.8 times the pixel density at the center. In this case, the second projection distance L' that is 1.25 times the first projection distance L will be permitted in the projection range of the projector apparatus 10, and the projector apparatus 10 can be arranged under that condition.

The variation characteristic of pixel density from the center toward the edge of the input picture can be estimated from the modulation transfer function (MTF) characteristic of the lens used when the picture is taken. Therefore, the first projection distance L and the second projection distance L' of each projector apparatus are determined so as to be accommodated in a range of the projection distance ratio estimated from the MTF characteristic of the input picture as not lowering the display resolution of the input picture.

In accordance with the embodiment described above, when an input picture taken by using a super-wide angle lens such as a fish-eye lens is projected by multiple projector apparatuses 10, the multiple projector apparatuses 10 are not arranged to result in equal intervals but are arranged in accordance with the variation in resolution in the input picture. In an input picture taken by using a super-wide angle lens, the resolution is not uniform within the screen and drops from the center toward the periphery. By arranging the plurality of projector apparatuses 10 in accordance with the variation in resolution in the input picture, the resolution of the picture projected onto the screen can be optimized.

Specifically, the plurality of projector apparatuses 10 are placed in an offset arrangement so that the apparatuses are as close as possible to the center of the curved screen 30 without causing a flaw in the image such as vignetting. This makes the pixel densities in the pictures projected from the respective projector apparatuses 10 non-uniform in the left-right direction. The closer to the center of the curved screen 30, the higher the pixel density in the picture projected onto the entirety of the curved screen 30. Accordingly, the distribution of pixel density in the picture observed by the user A will be closer to the distribution of pixel density in the picture taken by using a super-wide angle lens, and it is possible to project the picture onto the curved screen 30 without impairing the resolution that the input picture has. The method of arranging the plurality of projector apparatuses 10 according to the embodiment is particularly useful in the case of the curved screen 30 but is also effective to a certain degree in the case of the flat screen 30f.

Further, since it is not necessary to use a fish-eye lens or a special lens optimized to the curvature of the curved screen 30 as the projection lens 14 of the projector apparatus 10, the existent projector apparatus 10 can be utilized efficiently.

Described above is an explanation of the present invention based on an exemplary embodiment. The embodiment is intended to be illustrative only and it will be understood by those skilled in the art that various modifications to combinations of constituting elements and processes are possible and that such modifications are also within the scope of the present invention.

In this embodiment, a cylindrical screen of transmissive type having a convex rear side and curved in the horizontal direction as viewed from the user A, is used by way of example. In this respect, the method of arrangement according to the embodiment described above can equally be used in the case of a cylindrical screen of transmissive type having a convex rear side and curved in the vertical direction, provided that a plurality of projector apparatuses 10 are arranged in the vertical direction. Further, the method of arrangement according to the embodiment described above can equally be used in the case of a dome screen of transmissive type having a convex rear side, provided that a plurality of projector apparatuses 10 are arranged in the vertical direction and in the horizontal direction.

Further, the method of arrangement according to the embodiment described above can equally be used in the case a cylindrical screen or a dome screen of reflective type having a convex front side as viewed from the user A is used, and a plurality of projector apparatuses 10 project a picture from the front side.

Further, FIGS. 5-12 show an example in which the angle of the light axis of light projected by each projector apparatus 10 is adjusted by the arrangement of the projector apparatus 10. Alternatively, the angle may be adjusted by the swing angle adjustment function of the projector apparatus 10.

What is claimed is:

1. A projector system comprising:
a curved screen of transmissive type having a convex rear side as viewed from a user;
a plurality of projector apparatuses, each projector apparatus projecting a picture onto the curved screen; and
a control unit that divides an input picture into a plurality of pictures, providing an overlapping region between pictures, and supplies a plurality of divided pictures to the plurality of projector apparatuses, respectively, wherein
optical axis of light projected by the plurality of projector apparatuses intersect at a position farther than a central point of the curved screen as viewed from the plurality of projector apparatuses.

2. The projector system according to claim 1, wherein the curved screen is a cylindrical screen or a dome screen.

3. The projector system according to claim 1, wherein projecting positions of the plurality of projector apparatuses are set such that positions where the optical axis of light projected by the plurality of projector apparatuses impinge upon a projection surface of the curved screen are respectively closer to a center on the projection surface than a plurality of positions where the optical axis of projected light impinge upon the projection surface of the curved screen when the projecting positions of the plurality of projector apparatuses are arranged at equal intervals defined by an angle derived from dividing a central angle of the curved screen by the number of the plurality of projector apparatuses plus 1.

4. The projector system according to claim 3, wherein defining a distance between a position where a light axis of light projected by the projector apparatus impinges upon the projection surface of the curved screen and the projecting position of the projector apparatus as a first projection distance, defining a distance between a position derived from parallel shift of an extreme end position where light projected by the projector apparatus impinges upon the projection surface of the curved screen and the projecting position of the projector apparatus as a second projection distance, and defining a ratio of the second projection distance to the first projection distance as a projection distance ratio, the first projection distance and the second projection distance of each projector apparatus are determined so as to be accommodated in a range of the projection distance ratio identified as not lowering a display resolution of the input picture, based on a characteristic of variation of a pixel density from a center to an end of the input picture.

* * * * *